US012663348B2

(12) United States Patent
Zhu et al.

(10) Patent No.: US 12,663,348 B2
(45) Date of Patent: Jun. 23, 2026

(54) MULTI-PHASE FLUID MEASUREMENT USING LOW ACTIVITY SOURCES

(71) Applicant: Schlumberger Technology Corporation, Sugar Land, TX (US)

(72) Inventors: Jianhua Zhu, Singapore (SG); Massimiliano Fiore, Singapore (SG); Cheng-Gang Xie, Singapore (SG); Guillaume Jolivet, Clamart (FR); Felipe Nogueira, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 264 days.

(21) Appl. No.: 18/603,472

(22) Filed: Mar. 13, 2024

(65) Prior Publication Data

US 2024/0310260 A1 Sep. 19, 2024

Related U.S. Application Data

(60) Provisional application No. 63/489,796, filed on Mar. 13, 2023.

(51) Int. Cl.
*G01N 9/24* (2006.01)
*G01F 1/42* (2006.01)

(52) U.S. Cl.
CPC ................. *G01N 9/24* (2013.01); *G01F 1/42* (2013.01)

(58) Field of Classification Search
None
See application file for complete search history.

(56) References Cited

U.S. PATENT DOCUMENTS

| | | | |
|---|---|---|---|
| 7,908,930 B2 | 3/2011 | Xie | |
| 10,126,154 B2 | 11/2018 | Chazal | |
| 2006/0037385 A1* | 2/2006 | Gysling | ............... G01N 33/343 |
| | | | 73/61.79 |
| 2008/0319685 A1* | 12/2008 | Xie | ......................... G01N 9/24 |
| | | | 356/70 |

(Continued)

FOREIGN PATENT DOCUMENTS

WO 2019113741 A1 6/2019

OTHER PUBLICATIONS

"Regulations for the Safe Transport of Radioactive Material", 2018 Edition, IAEA Safety Standards, downloaded from the Internet on May 12, 2025 at [https://www-pub.iaea.org/MTCD/Publications/PDF/PUB1798_web.pdf], 190 pages.

(Continued)

*Primary Examiner* — Eric S. McCall
*Assistant Examiner* — Nigel H Plumb
(74) *Attorney, Agent, or Firm* — Jeffrey D. Frantz

(57) ABSTRACT

Methods and apparatus for using exempt gamma photon sources to measure fluid properties are described herein. The gamma photon sources are used with detectors in an arrangement that provides a short photon path length between source and detector. Fluid measurement devices described herein have a fluid container defining an interior, an exempt gamma-ray source located outside the fluid container, and a gamma-ray detector located outside the fluid container, the exempt gamma photon source and the gamma-ray detector defining a photon path that traverses the interior of the fluid container along a non-diametric chord of the fluid container.

20 Claims, 6 Drawing Sheets

(56) References Cited

U.S. PATENT DOCUMENTS

| | | | |
|---|---|---|---|
| 2011/0301899 A1* | 12/2011 | David | G01F 1/74 |
| | | | 702/100 |
| 2016/0011033 A1* | 1/2016 | Chen | G01F 1/58 |
| | | | 378/67 |
| 2018/0292566 A1 | 10/2018 | Fiore | |
| 2020/0264020 A1 | 8/2020 | Xu | |
| 2021/0404849 A1* | 12/2021 | Xie | G01F 1/74 |

OTHER PUBLICATIONS

"Specific Gamma-Ray Dose Constants for Nuclides Important to Dosimetry and Radiological Assessment", Oak Ridge National Laboratory, 1982, downloaded from the Internet on May 12, 2025 at [https://www.osti.gov/servlets/purl/6246345/], 81 pages.

"Council Directive 2013/59/EURATOM", European Union Council Directive, 2013, downloaded from the Internet on May 12, 2025 from [https://eur-lex.europa.eu/legal-content/EN/TXT/PDF/uri=CELEX:32013L0059], 73 pages.

"Exempted Source Water Cut Meter (XC-WCM)", downloaded from the Internet on May 13, 2025 from [https://web.archive.org/web/20201021040110/http://www.haimotech.com/Products-and-Services/mpfm/XC-WCM.html], HAIMO, 2025, 12 pages.

* cited by examiner

400

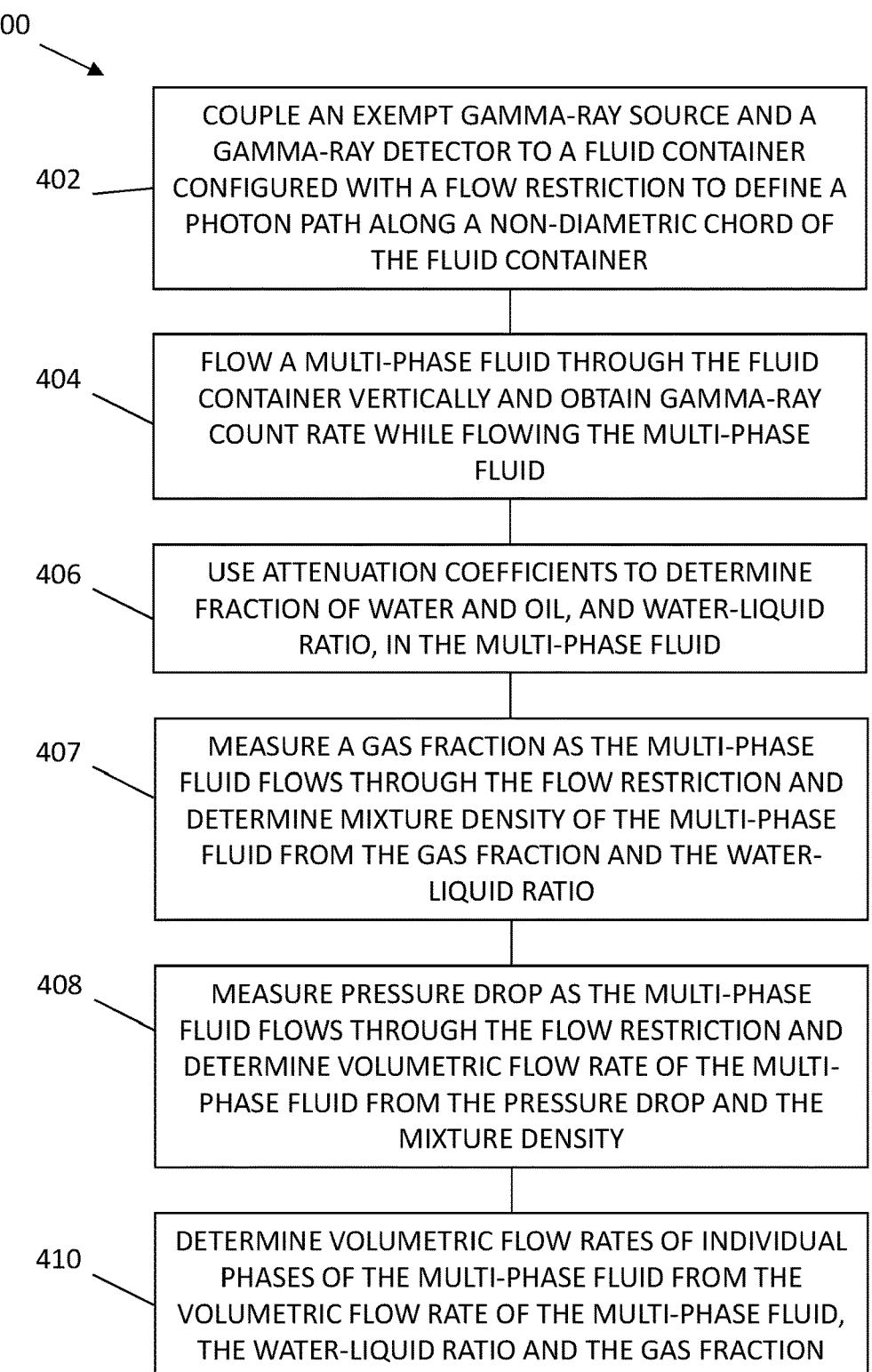

402 — COUPLE AN EXEMPT GAMMA-RAY SOURCE AND A GAMMA-RAY DETECTOR TO A FLUID CONTAINER CONFIGURED WITH A FLOW RESTRICTION TO DEFINE A PHOTON PATH ALONG A NON-DIAMETRIC CHORD OF THE FLUID CONTAINER

404 — FLOW A MULTI-PHASE FLUID THROUGH THE FLUID CONTAINER VERTICALLY AND OBTAIN GAMMA-RAY COUNT RATE WHILE FLOWING THE MULTI-PHASE FLUID

406 — USE ATTENUATION COEFFICIENTS TO DETERMINE FRACTION OF WATER AND OIL, AND WATER-LIQUID RATIO, IN THE MULTI-PHASE FLUID

407 — MEASURE A GAS FRACTION AS THE MULTI-PHASE FLUID FLOWS THROUGH THE FLOW RESTRICTION AND DETERMINE MIXTURE DENSITY OF THE MULTI-PHASE FLUID FROM THE GAS FRACTION AND THE WATER-LIQUID RATIO

408 — MEASURE PRESSURE DROP AS THE MULTI-PHASE FLUID FLOWS THROUGH THE FLOW RESTRICTION AND DETERMINE VOLUMETRIC FLOW RATE OF THE MULTI-PHASE FLUID FROM THE PRESSURE DROP AND THE MIXTURE DENSITY

410 — DETERMINE VOLUMETRIC FLOW RATES OF INDIVIDUAL PHASES OF THE MULTI-PHASE FLUID FROM THE VOLUMETRIC FLOW RATE OF THE MULTI-PHASE FLUID, THE WATER-LIQUID RATIO AND THE GAS FRACTION

Fig. 4

MULTI-PHASE FLUID MEASUREMENT USING LOW ACTIVITY SOURCES

This application claims the benefit of U.S. provisional application No. 63/489,796, filed Mar. 13, 2023, which is hereby incorporated in its entirety by reference.

FIELD

This patent application relates to apparatus and methods for measuring properties of multi-phase fluids using low activity sources. Specifically, this application describes different ways to use low activity sources to measure a ratio of water to total liquid in a multi-phase flow, and to resolve mass flow rate of a multi-phase fluid.

BACKGROUND

Multi-phase flow measurement devices are commonly used in hydrocarbon production processes. Produced streams usually contain an oil phase, a water phase, and a gas phase as a multi-phase flow. It is desired to measure the individual phase flow rate of such multi-phase streams without separating the phases, a challenging proposition that can be quite complicated.

It is known and commonly practiced to measure attenuation of gamma ray photons through such a fluid to indicate the fractions of water, oil, and gas in the flow. Usually, gamma ray photons of two different energies are projected through the fluid, and photons arriving at a detector are counted. Complex processing is used to analyze the count rate to resolve phase fractions.

The gamma ray sources commonly used have activity levels that warrant special structures and procedures for handling that can be costly and cumbersome. Methods and apparatus for using low activity sources for such applications, to avoid such costly and cumbersome efforts, are needed.

SUMMARY

Embodiments described herein provide a fluid measurement device, comprising a fluid container defining an interior and having a diameter line; an exempt gamma-ray source located outside the fluid container; and a gamma-ray detector located outside the fluid container, the exempt gamma-ray source and the gamma-ray detector defining a photon path that traverses the interior of the fluid container parallel to, and spaced apart from, the diameter line.

Other embodiments described herein provide a fluid measurement device, comprising a fluid container defining an interior; an exempt gamma-ray source located external to an outer wall of the fluid container to emit photons into the interior of the fluid container; and a gamma-ray detector located external to the outer wall of the fluid container, the exempt gamma-ray source and the gamma-ray detector defining a photon path having a photon path length of from about 3 cm to about 6 cm, wherein at least a portion of the photon path traverses the interior of the fluid container, and the photon path is along a non-diametric chord of the fluid container.

Other embodiments described herein provide a method of fluid flow measurement, comprising disposing an exempt gamma-ray source and a gamma-ray detector outside a fluid container to define a first photon path between the gamma-ray source and gamma-ray detector that traverses an interior of the fluid container along a non-diametric path; disposing a microwave transmitting antenna and a microwave receiving antenna outside the fluid container to define a second photon path between the microwave transmitting antenna and the microwave receiving antenna that traverses the interior of the fluid container; flowing a multi-phase fluid through the fluid container; while flowing the multi-phase fluid through the fluid container, obtaining a count rate of gamma photons propagated through the multi-phase fluid using the gamma-ray source and the gamma-ray detector and measuring dielectric properties of the multi-phase fluid using the microwave transmitting antenna and the microwave receiving antenna; measuring pressure drop as the multi-phase fluid flows through a flow restriction of the fluid container; determining water-liquid ratio of the multi-phase fluid from the count rate of gamma photons; determining a gas fraction of the multi-phase fluid from the measured dielectric properties and the water-liquid ratio; calculating a mixture density of the multi-phase fluid based on the water-liquid ratio and the gas fraction; determining volumetric flow rate of the multi-phase fluid from the measured pressure drop and the calculated mixture density; and determining volumetric flow rates of gas, water and oil in the multi-phase fluid from the volumetric flow rate of the multi-phase fluid, the gas fraction and the water-liquid ratio.

BRIEF DESCRIPTION OF THE DRAWINGS

FIG. 4 is a flow diagram summarizing a method of using an exempt gamma-ray source transmission instrument according to one embodiment.

DETAILED DESCRIPTION

Figure 1:
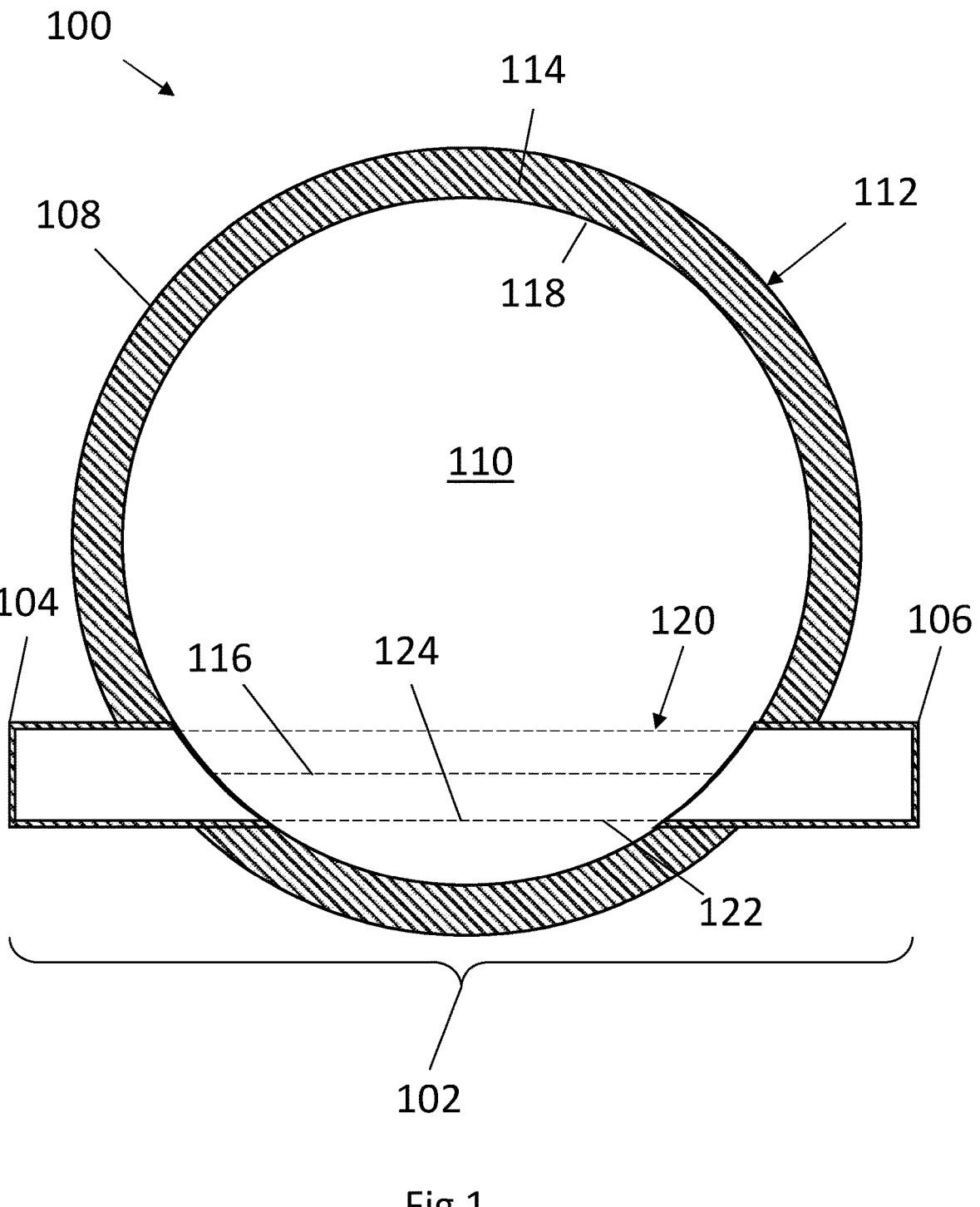
FIG. 1 is a schematic cross-section of a fluid measurement device that uses a gamma-ray source transmission instrument with an exempt gamma-ray source.

Apparatus and methods are described herein for using low activity gamma-ray sources to measure multi-phase flow in a conduit. The low activity sources are generally easier to handle because radioactive emissions from such sources are much lower than emissions from conventional sources. Such sources are referred to herein as "exempt sources," because they tend to be exempt from regulations applied to conventional radioactive sources. The IAEA has established an activity limit of 1 MBq for exempt radioactive sources. Such sources can be used in situations where distance between the source and detector can be reduced to a dimension that enables accurate X-ray and gamma-ray counting of emission events through the multi-phase fluid. Instruments that use low activity sources can also be smaller and simpler than instruments that use higher-activity non-exempt sources because many of the high-density metal shields used with non-exempt sources to prevent excessive exposure to radiation are not needed when using low-activity exempt sources.

In the embodiments herein, an exempt gamma-ray source and a gamma-ray detector are positioned at the outside of a fluid container, which may be a static fluid container or a fluid flow conduit, to direct photons through the fluid inside the fluid container and to detect attenuation effect of the fluid on the photons. The source and detector are positioned at locations that use geometry of the fluid container to provide a reduced attenuation path length between source and detector so that the low photon count from the low activity source can be used to detect fluid properties. The source and detector are positioned outside the fluid container so the internal geometry of the fluid container is not changed by the presence of the source and detector. In cases where the fluid container is a fluid flow conduit, the internal geometry of the fluid conduit may be needed to measure flow rate of the fluid, so positioning the low activity source and detector outside the fluid flow conduit can preserve fluid flow characteristics that provide ways to measure fluid flow rate, such as by measuring pressure drop.

In general, the exempt gamma-ray source and detector are used to measure attenuation of photons having two distinct energy levels and to derive fraction of water in total liquid (water-liquid ratio, WLR). An exempt $^{133}$Ba source having nominal activity up to 1 MBq can be used for such applications where source-detector distance (photon path length) is less than about 6 cm, for example about 3 cm to about 6 cm, to maximize count rate. Mass of mechanical parts disposed between source and detector can also be reduced, since the exempt source will not need many of the shields used with non-exempt sources. In some cases, source and detector can also be positioned to propagate gamma-rays in a near-wall region of a fluid conduit so the gamma-rays encounter portions of the fluid with lower gas fraction measured along a reduced path length. Finally, photons emitted from the source can be collimated to illuminate, as much as possible, the full surface area of the detector to maximize count rate.

FIG. 1 is a schematic cross-section of a fluid measurement device 100 that uses a gamma-ray transmission instrument 102 with an exempt source. The gamma-ray transmission instrument 102 has an exempt gamma-ray source 104 arranged with a detector 106 to detect photons emitted by the exempt gamma-ray source 104. In this case, the exempt gamma-ray source 104 is a 1 MBq $^{133}$Ba source. Other sources can be used that emit photons at a first energy below about 40 keV and a second energy above about 50 keV, such as $^{153}$Gd, $^{130}$Ce, and $^{152}$Eu. These radionuclides have different emission intensities, half-lives, and exemption limits that may be useful for specific embodiments. The detector 106 can comprise a scintillation crystal with decay time preferably shorter than 250 ns (such as NaI, YAP or CeBr₃), a photon-to-electron conversion device (such as a photomultiplier tube PMT or a semiconductor detector), and an energy spectrum analyzer (such as a multichannel analyzer MCA). The detector 106 can be a digital detector like a digital gamma-ray detector 304 shown in FIG. 3. The source 104 and detector 106 are arranged outside a fluid container 108 that contains a multi-phase fluid 110. The fluid container 108 may be a fluid flow conduit with the multi-phase fluid 110 flowing through the conduit. The source 104 and detector 106 are arranged along an outer surface 112 of an outer wall 114 of the fluid container 108 with the source 104 positioned to emit photons into the fluid 110 to traverse across the fluid conduit to the detector 106. The source 104 is configured to collimate emitted photons along a photon path toward the detector 106 such that count rate is maximized.

The source 104 and detector 106 are arranged along a non-diametric chord 116 of the fluid container 108. Arranging the source 104 and detector 106 along the non-diametric chord 116 reduces photon path length from source 104 to detector 106 to minimize photon loss. Where a vertically-flowing multi-phase fluid 110 contains significant gas fraction, fluid flow dynamics result in lower gas fraction near an inner surface 118 of the outer wall 114 than near a central area of the fluid 110. Arranging the source 104 and detector 106 along a non-diametric chord 116 also reduces gas fraction encountered by photons traversing through the fluid, reducing uncertainty in WLR resolved from interpreting photon count rates at the detector 106.

In this case, the source 104 is configured to provide a photon path that is 14 mm wide, and the source 104 and detector 106 are arranged such that the photon path intersects a perpendicular radius of the fluid container 108 at distances from the inner surface 118 of the outer wall 114 that are no more than about 80% of the radius of the fluid container 108. In most cases, the photon path will intersect a perpendicular radius of the fluid container 108 at a distance from the inner surface 118 that is about 20% to about 80% of the radius of the fluid container 108. Thus, in most cases, the photon path will have an extent, in the width direction, from about 20% of the radial distance of the fluid container 108 to about 80% of the radial distance of the fluid container 108. In other cases, however, the photon path can traverse the interior of the fluid container 108 along different pathways closer to a diameter line of the fluid container 108 or closer to the inner surface 118 of the outer wall 114, according to fluid properties and fluid flow conditions. In this case, the photon path intersects the perpendicular radius at from 26% or 78% of the radius of the fluid container 108, so the photon path has an extent, in the width direction, from about 26% of the radial distance of the fluid container 108 to about 78% of the radial distance of the fluid container 108. Here, the fluid container 108 has a radial distance, measured from the inner surface 118, of 19 mm, the source 104 and detector 106 are arranged to have a photon pathway 120 that has an extent, in the width direction (transverse to nominal propagation direction of the photons), of about 10 mm, and the non-diametric chord 116 is selected such that the photon pathway 120 has a nearest edge 122 that has a midpoint 124 located about 5 mm from the nearest point of the inner surface 118. In this case, the distance from source to detector is, for example, about 5.4 cm.

Where small radius fluid containers are used, the photon path can be moved to the diameter to measure water-liquid ratio and the cross-diameter fluid density (and therefore gas fraction) of a multi-phase fluid within the fluid container, and where larger radius fluid containers are used, the photon path can be moved closer to the inner surface 118 of the outer wall 114 to measure water-liquid ratio of the multi-phase fluid.

The fluid container 108, source 104, and detector 106 can be installed as a unit in a fluid conduit to measure WLR of a multi-phase fluid flowing through the fluid conduit. The fluid container 108 can be provided with a flange connection, or can be welded, or otherwise attached, to the fluid conduit, and is usually installed in a vertical orientation. As noted above, the exact selection of the location of the non-diametric chord 116 can be optimized to maximize count rate depending on overall gas fraction of the fluid 110 and size of the fluid container 108.

Figure 2A:
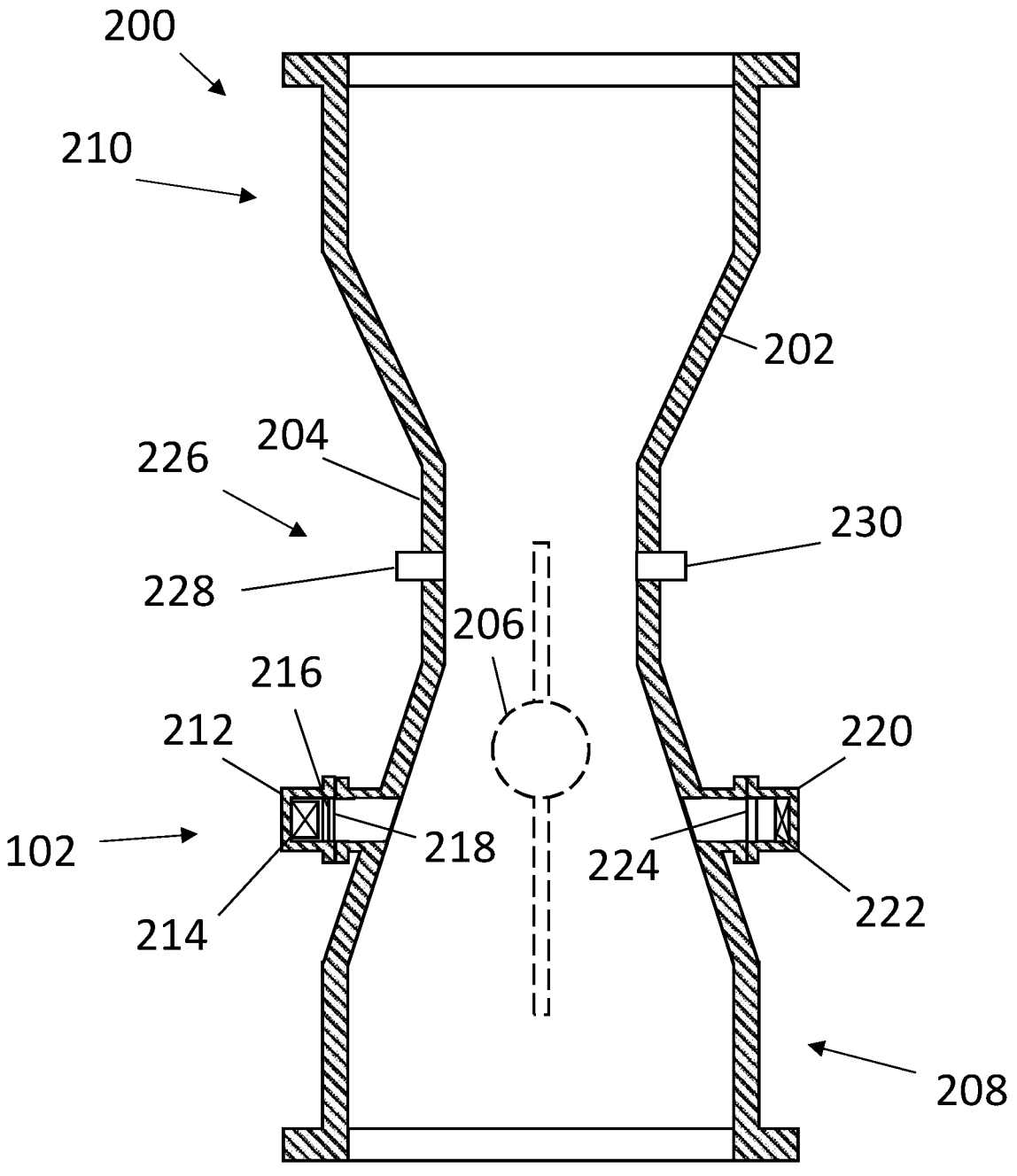
FIG. 2A is a schematic cross-sectional view of another fluid measurement device that uses the gamma-ray source transmission instrument used in FIG. 1.

FIG. 2A is a schematic cross-sectional view of a fluid measurement device 200 that uses the gamma-ray transmission instrument 102. The device 200 has a fluid container 202 that has a narrow portion 204 to provide a flow restriction that can be used to measure pressure drop to derive volumetric or mass flow through the device 200. The fluid container 202 has an inlet side 208 and an outlet side 210. A pressure drop instrument 206 (shown in phantom) can be arranged to measure pressure drop from the inlet side 208 to the narrow portion 204. The pressure drop instrument 206 includes a pressure sensor, and can include a temperature sensor, or a separate temperature sensor can be provided. The gamma-ray transmission instrument 102 is arranged, here, in the tapered portion at the inlet side 208 of the fluid container 202. As noted above, because the source and detector of the gamma-ray transmission instrument 102 are arranged outside the fluid container 202, fluid flow through the measurement device 200 is not disturbed by the gamma-ray transmission instrument 102, so known flow calculation methods can be used. As above, the gamma-ray transmission instrument 102 is arranged along a non-diametrical chord of the fluid container 202 to maximize photon count rate at the detector so water-liquid ratio can be usefully measured.

The source 104, here, has a source holder 212 which holds an emitter 214 that has nominal activity of 1 MBq or less. Because the emitter has low activity, the source holder 212 can be less massive than non-exempt source enclosures. For example, the source holder 212, in this case, can be made of 0.7 cm thick tungsten or 3.5 cm thick stainless steel to give radiation dose rate, at 10 cm from the source 104, less than 1 µSv/h. A source window 216, which may be made of beryllium, isolates the emitter 214, and a shield 218, which can be made of a thermoplastic material such as PEEK, or another plastic material, seals the source holder 212 against fluid pressure within the fluid container 202. The detector 106 uses a similar detector holder 220 to contain a detection medium 222, such as suitable scintillator crystal or semiconductor materials. A detector window 224, which can be a thermoplastic material such as PEEK, or another plastic material, seals the detector holder 220 against fluid pressure within the fluid container 202. Because the emitter 214 is a low-activity exempt emitter, many of the components of a non-exempt source and detector can be omitted and source-detector distance can be reduced.

The fluid measurement device 200 may also use a microwave transmission measurement device 226 to measure gas fraction by measuring dielectric properties of the fluid in the fluid container 202. The microwave device 226 has at least a microwave transmitting antenna 228 and microwave receiving antenna 230 positioned diametrically opposite in the narrow portion 204 of the fluid container 202. The transmitting antenna 228 and receiving antenna 230 are shown schematically to illustrate use of such an instrument along with the other instruments shown, and positional relationship of the instruments. The microwave transmission measurement device 226 may have a second microwave transmitting antenna and a second microwave receiving antenna (not shown here) positioned diametrically opposite in the narrow portion 204 of the fluid container 202, with an appropriate axial spacing from the transmitting antenna 228 and receiving antenna 230. None of the instruments in FIG. 2A or in FIG. 2B protrudes in any way into the interior of the fluid container 202, so fluid flow dynamics of any fluid flowing within the fluid container 202 are not disrupted by the instruments.

The fluid measurement device 200 is a Venturi-style device with tapered narrow portion 204 providing the flow restriction for determination of total volumetric flow rate from measured pressure drop, and for determination of individual phase volumetric flow rate from the total volumetric flow rate, water-liquid ratio measured by the gamma-ray transmission instrument 102, and gas fraction measured by the microwave device 226. An embodiment of the fluid measurement device 200 has diameter ratio of the narrow portion 204 to the inlet side 208 of β=0.5. In FIG. 2A, the gamma-ray transmission instrument 102 is disposed in the tapered portion of the inlet side 208 of the fluid container 202.

Figure 2B:
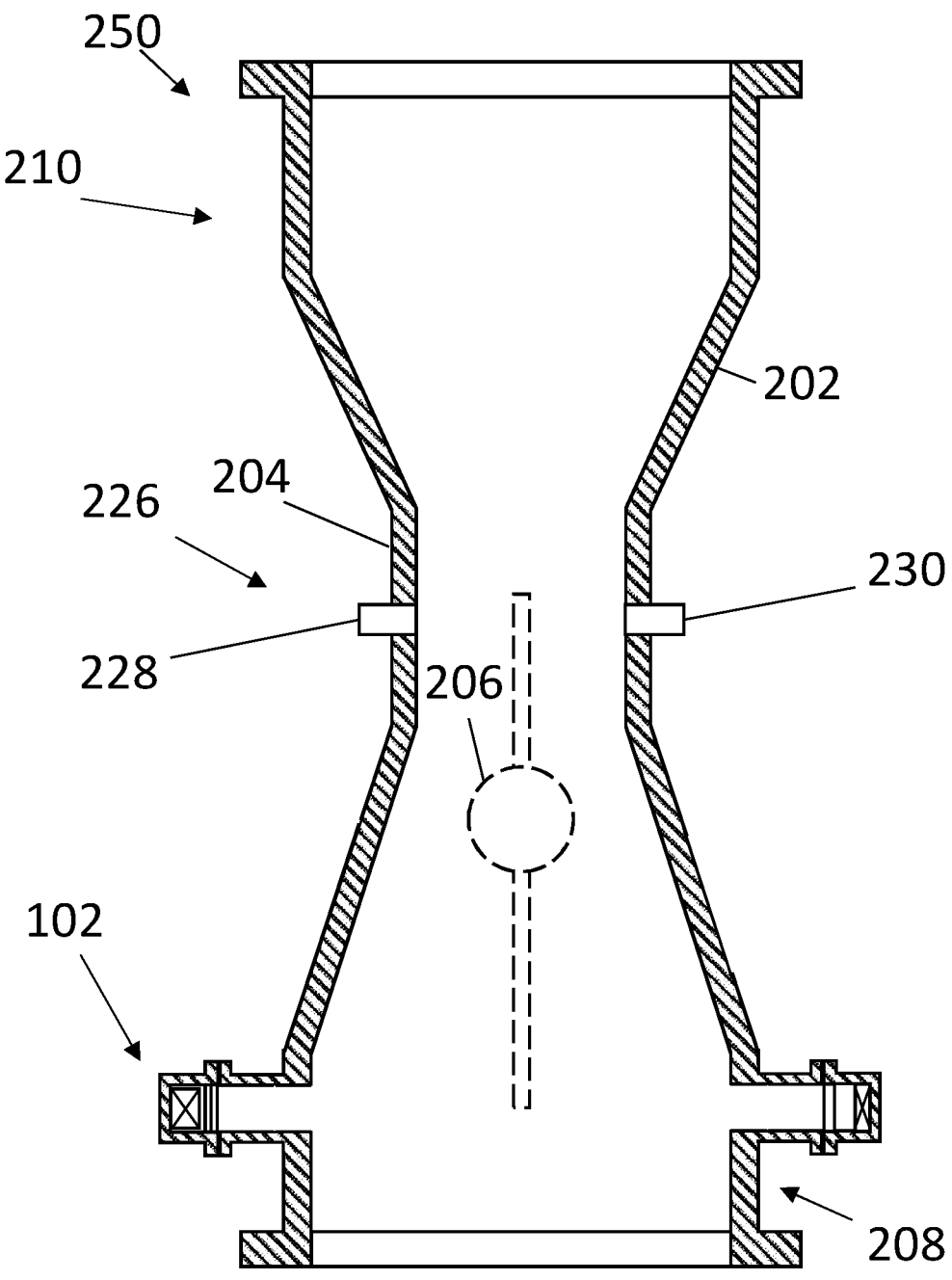
FIG. 2B is a schematic cross-sectional view of another fluid measurement device that uses the gamma-ray source transmission instrument used in FIG. 1.

FIG. 2B is a schematic cross-sectional view of another fluid measurement device 250, similar to the device 200, but with the gamma-ray transmission instrument 102 disposed beyond the tapered portion at the inlet side 208 of the fluid container 202. The gamma-ray transmission instrument 102 can be located at any desired liquid-rich location of the fluid container 202. Locating the gamma-ray transmission instrument 102 at the straight portion, beyond the tapered portion, of the inlet side 208 can avoid any fluid dynamic impacts from the tapered portion of the fluid container 202 on the morphology of the fluid at the gamma-ray transmission instrument 102. For example, if the tapering of the fluid container 202 is expected to change the gas fraction within the fluid due to fluid dynamic impacts, such changes can be substantially avoided by locating the gamma-ray transmission instrument 102 far enough from the tapered portion of the inlet side 208, as in FIG. 2B. Where such impacts might be advantageous, for example by reducing gas fraction near the inner surface of the wall of the fluid container 202 for improved determination of water-liquid ratio (see FIG. 1), the gamma-ray transmission instrument 102 can be located in the tapered portion of the inlet side 208. Similar to the device 200, in the device 250 of FIG. 2B, the microwave device 226 has at least a microwave transmitting antenna 228 and microwave receiving antenna 230 positioned diametrically opposite in the narrow portion 204 of the fluid container 202. In some cases, the microwave device 226 having at least a microwave transmitting antenna 228 and microwave receiving antenna 230 may be positioned diametrically opposite and at the same inlet side 208 of the fluid container 202, as the gamma-ray transmission instrument 102.

In some cases, a small diameter flow system can use an exempt gamma-ray transmission instrument disposed along a diameter of a fluid flow conduit. For example, in low production flow instruments, diameter of the fluid conduit may be less than 10 mm, for example less than 6 mm. In such cases, a gamma-ray transmission instrument with an exempt source can be disposed along a diameter of the fluid container with adequate count rate detection. Such flow systems can be Venturi-style systems with tapered fluid flow conduits. Depending on the size of the flow system, the gamma-ray transmission instrument with exempt source can be located at the narrow portion, along the tapered portion on the inlet side, or beyond the tapered portion on the inlet side of the flow system. Some such flow systems can be used for the measurement of liquid volumetric flow rates of 50 bbl/d or less.

Figure 2C:
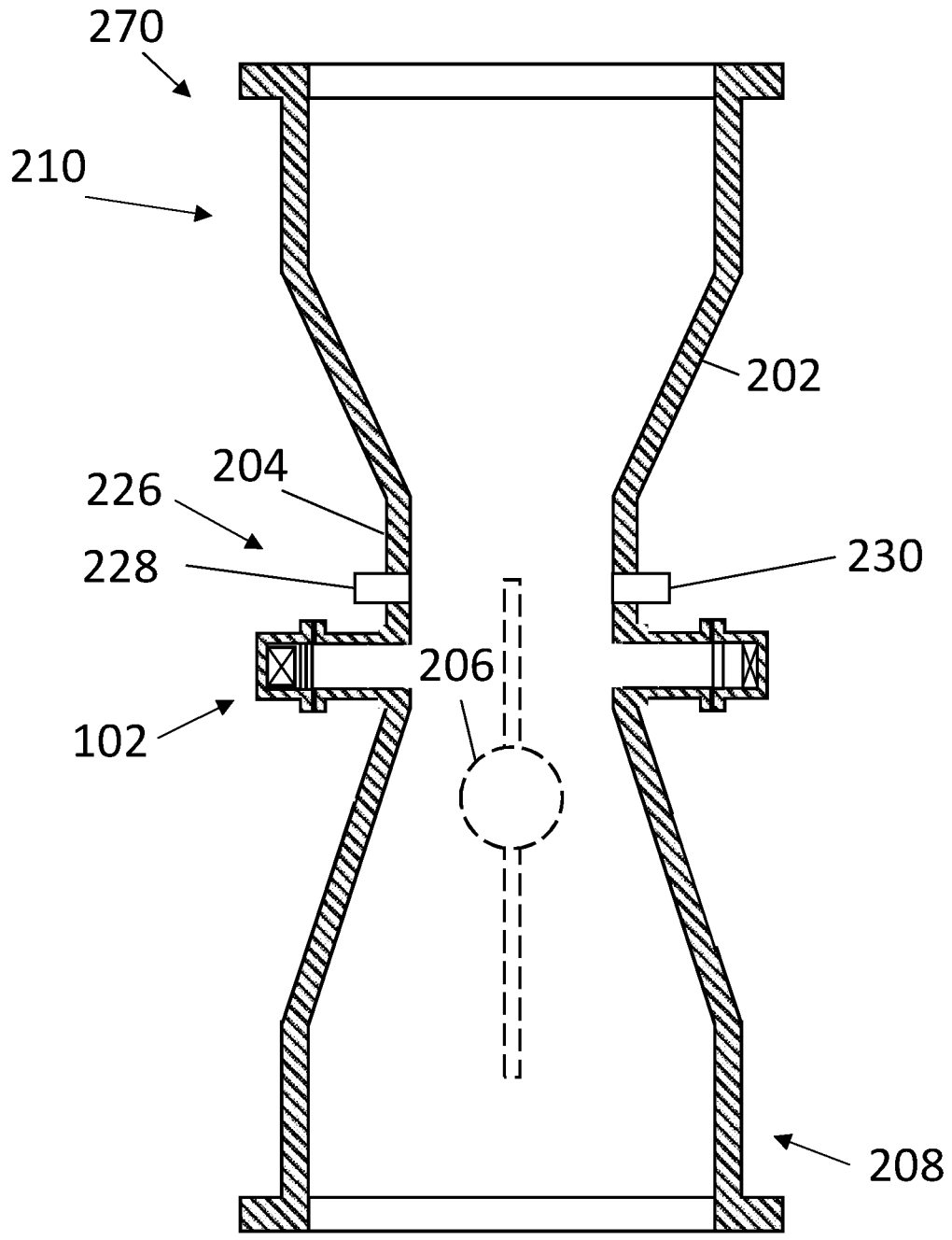
FIG. 2C is a schematic cross-sectional view of another fluid measurement device that uses the gamma-ray source transmission instrument used in FIG. 1.

FIG. 2C is a schematic cross-sectional view of another fluid measurement device 270 that uses the gamma-ray source transmission instrument used in FIG. 1. The fluid measurement device 270 of FIG. 2C is similar to the fluid measurement devices 200 and 250 of FIGS. 2A and 2B, except with the gamma-ray transmission instrument 102 located at the narrow portion 204 of the device 270 along with the microwave device 226. In this case, the gamma-ray device 102 is located closer to the inlet side 208 of the device than the microwave device 226, but in other embodiments the two devices could be located at the same axial position (i.e. same distance from the inlet side 208), for example by providing an angular displacement between the alignment of the gamma-ray device 102 and the microwave device 226. In other embodiments, the microwave device 226 can be located closer to the inlet side 208 than the gamma-ray device 102. The two devices 102 and 226 can be located arbitrarily close or distant, one from the other, with no fluid dynamics restrictions on the relative locations of the two devices. Thus, the two devices 102 and 226, in FIG. 2C, can be located at opposite ends of the narrow portion 204, at the same axial position, or space apart any convenient distance.

It should be noted that reducing source-detector spacing can increase count rate uncertainty due to Poisson noise at the low count rates experienced with exempt sources. The impact of Poisson noise on uncertainty in attenuation coefficients can be mitigated by integrating count rates over long time periods, or by including fluorescent material in the exempt emitter to provide secondary photon generation. Such methods of reducing uncertainties are known, and can be applied here in the context of exempt sources to reduce the impact of Poisson noise on attenuation coefficient uncertainty.

Figure 3:
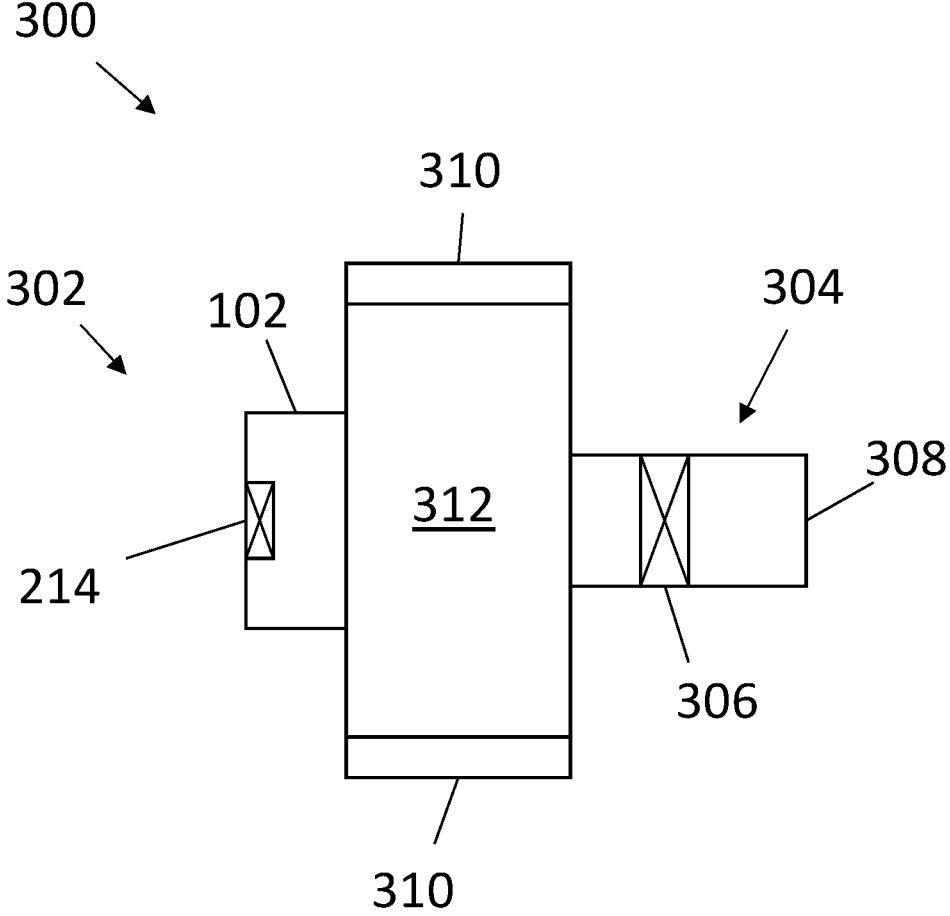
FIG. 3 is a schematic elevation view of a portable fluid measurement device that uses an exempt gamma-ray source transmission instrument according to one embodiment.

FIG. 3 is a schematic elevation view of a portable fluid measurement device 300 that uses an exempt gamma-ray transmission instrument 302. The exempt gamma-ray transmission instrument 302 has the exempt source 104 of FIG. 1, with the exempt emitter 214 of FIG. 2A, both shown schematically. The gamma-ray transmission instrument 302 also has a digital gamma-ray detector 304 suitable for transmitting count rate information, or other information derived from and representing count rates or parameters derived from count rates, to a network or digital device. The digital detector 304 generally has a detection medium 306, such as the detection medium 222 of FIG. 2A, but also has a digital acquisition device 308 to acquire detection event signals and digitize them for digital storage or transmission. The digital detector 304 may include a power supply as part of the digital acquisition device 308, or may be powered using an external power supply. The digital detector 304 can be connected to a digital acquisition system for computation of fluid characteristics based on signals received by the digital detector 304. The digital detector 304 is equipped with one or more connectivity devices, such as an RS-485 or Ethernet device, along with conditioning circuitry to create suitable voltage signals from detection events of the detection medium. It should be noted that the digital detector 304 can be used with any of the flow systems described herein, which is to say that the detector 106 can be a digital detector like the detector 304.

The fluid measurement device 300 generally has a fluid container 312 to house a fluid for measurement using the gamma-ray transmission instrument 302. The fluid container 312 can be coupled to a fluid flow conduit, such as a pipe, so that fluid can flow through the fluid container 312 to be sampled. The fluid container 312 can have valves 310 for capturing a sample within the container 312. The fluid measurement device 300 is constructed with tight tolerances to minimize potential variation in dimensions and physical arrangement of the device due to shock and vibration during transmission and operation.

The fluid container 312 can have a geometry optimized to provide accurate count rates using the exempt source 104. For example, the fluid container 312 can be a hollow cylinder with a small diameter so source-detector distance can be optimized. Transfer functions can be defined to transform attenuation coefficients determined using the fluid measurement device 300 to another fluid measurement device with different geometry (i.e. larger diameter) using the same radionuclide in an exempt or non-exempt source. The fluid measurement device 300 can be portable, so the device can be coupled into a fluid flow structure devised for accommodating the device 300 (for example two fluid lines that can be connected to the two ends of the fluid container 312), or the fluid measurement device 300 can be installed into a sampling loop to sample well fluids. The fluid measurement device 300 can be a static fluid measurement device, if a fluid is captured within the fluid container 312, for example by closing the valves 310, or a dynamic fluid measurement device if measurement is performed while fluid flows through the fluid container 312.

FIG. 4 is a flow diagram summarizing a method 400 according to one embodiment. The method 400 is a method of measuring a fluid flow rate, and utilizes an exempt gamma-ray transmission device to measure phase properties of a fluid. The method 400 enables use of exempt gamma-ray sources that are easier to use and transport than non-exempt sources by optimizing deployment of the exempt gamma-ray source and the detector such that count rates are maximized and uncertainties minimized.

At 402, an exempt gamma-ray source and a gamma-ray detector are coupled to a fluid container configured with a flow restriction. The source and detector are positioned so that a distance between an exempt photon emitter of the exempt gamma-ray source and the gamma-ray detector is from about 3 cm to about 6 cm and or such that a photon path defined by the source and detector traverses an interior of the fluid container along a non-diametric chord or path of the container. For example, if the fluid container has a diameter line, the gamma-ray source and detector are disposed such that the photon path defined by the gamma-ray source and detector traverses the interior of the fluid container parallel to, and spaced apart from, the diameter line. The exempt gamma-ray source generally has nominal activity of 1 MBq or less to comply with IAEA standards. The gamma-ray source and detector are coupled to the outside of the fluid container to avoid any disturbance to fluid flow properties within the fluid container.

At 404, a multi-phase fluid is flowed vertically through the flow restriction while gamma photons from the exempt gamma-ray source propagate through the fluid to the gamma detector. The gamma detector counts photons arriving from the gamma-ray source with at least two different energies.

At 406, attenuation coefficients are used to determine fraction of water and oil, and water-liquid ratio, in the multi-phase fluid from count rates of the photons having the at least two different energies. Known noise reduction and uncertainty mitigation techniques can be applied to increase accuracy of the count rates and the water-liquid ratio determined therefrom. The attenuation coefficients may be determined using a calibration instrument that positions a fluid sample between an exempt gamma photon source and detector that may match the source and detector used at 404. Oil and water are separately disposed in a container of the calibration instrument to define count rates for both liquids, and the instrument is used to measure an empty container count rate. Density and temperature of the oil and water phases, and of the multi-phase fluid, can be measured using a densitometer and a temperature sensor, each of which may be a separate instrument or may be coupled with the calibration instrument. The fluid container of the instrument may have geometry that is identical to the geometry of the fluid container of 402, or different. Where the geometry of the fluid container of the instrument is different from that of the fluid container of operation 402, transfer functions can be derived to transform the attenuation coefficients obtained using the instrument to the geometry of the fluid container used at 402 by known techniques.

At 407, gas fraction of the multi-phase fluid is measured as the fluid flow through the flow restriction. From the water-liquid ratio and the gas fraction, mixture density of the multi-phase fluid can be determined using known densities of the three phases. Gas fraction of the multi-phase fluid can be measured using the water-liquid ratio determined at 406 and multi-phase fluid mixture dielectric properties determined by microwave transmission devices deployed as described herein.

At 408, a pressure drop is measured as the fluid flow through the flow restriction. The fluid container and flow restriction are generally configured according to standard constructions such that known relations can be used to determine volumetric fluid flow rate from measured pressure drop.

At 410, the volumetric flow rate of the multi-phase fluid, the water-liquid ratio (or fractions of water and oil), and the gas fraction are used to determine volumetric flow rates of individual phases of the multi-phase fluid. Densities of the water, oil, gas, and multi-phase fluid, along with water-liquid ratio determined at 406, gas fraction determined at 407, and volumetric flow rate determined at 408, can be used to determine mass flow rates of water, oil, and gas in the multi-phase fluid. Where a gamma-ray source and detector are diametrically disposed across a fluid conduit of small diameter, gas fraction and mixture density, and water-liquid ratio can also be measured by gamma-ray attenuation and used, along with pressure drop, to derive total volumetric flow rate and volumetric flow rates of individual phases in the multi-phase fluid. Individual phase densities determined by gamma-ray attenuation measurements of the separate fluids (gas, water, and oil) can also be used to derive individual phase mass flow rates from the individual phase volumetric flow rates.

The preceding description has been presented with reference to present embodiments. Persons skilled in the art and technology to which this disclosure pertains will appreciate that alterations and changes in the described structures and methods of operation can be practiced without meaningfully departing from the principle, and scope of this present disclosure. Accordingly, the foregoing description should not be read as pertaining only to the precise structures described and shown in the accompanying drawings, but rather should be read as consistent with and as support for the following claims, which are to have their fullest and fairest scope.

The invention claimed is:

1. A fluid measurement device, comprising:
a fluid container comprising an inlet side and an outlet side opposite the inlet side, the fluid container configured to direct a fluid in a non-horizontal direction from the inlet side to the outlet side, the fluid container defining an interior and having a diameter line perpendicular to the non-horizontal direction;
an exempt gamma-ray source located outside the fluid container; and
a gamma-ray detector located outside the fluid container, the exempt gamma-ray source and the gamma-ray detector defining a photon path that traverses the interior of the fluid container in a direction parallel to, and spaced apart from, the diameter line.

2. The fluid measurement device of claim 1, wherein the fluid measurement device is a portable static fluid device and the fluid container is a static fluid container.

3. The fluid measurement device of claim 1, wherein a length of the photon path is from 3 cm to 6 cm.

4. The fluid measurement device of claim 1, wherein the fluid measurement device is a fluid flow measurement device and the fluid container is a fluid flow conduit.

5. The fluid measurement device of claim 1, wherein the fluid comprises a non-separated multi-phase fluid.

6. The fluid measurement device of claim 1, wherein the fluid measurement device is a Venturi device and the fluid container is a fluid flow conduit of the Venturi device.

7. The fluid measurement device of claim 6, wherein:
the fluid flow conduit has a narrow portion;
the photon path is a first photon path;
the first photon path is positioned at the inlet side;
the fluid measurement device further comprises:
a microwave source; and
a microwave detector;
the microwave source and the microwave detector define a second photon path; and
the microwave source and the microwave detector are positioned to dispose the second photon path at the narrow portion.

8. The fluid measurement device of claim 7, wherein a length of the first photon path is from 3 cm to 6 cm.

9. The fluid measurement device of claim 8, wherein the first photon path is angled with respect to the second photon path.

10. A fluid measurement device, comprising:
a fluid container comprising an inlet side and an outlet side opposite the inlet side, the fluid container configured to direct a fluid in a non-horizontal direction from the inlet side to the outlet side, the fluid container defining an interior and having a diameter line perpendicular to the non-horizontal direction;
an exempt gamma-ray source located external to an outer wall of the fluid container to emit photons into the interior of the fluid container; and
a gamma-ray detector located external to the outer wall of the fluid container, the exempt gamma-ray source and the gamma-ray detector defining a photon path having a photon path length of from 3 cm to 6 cm, wherein at least a portion of the photon path traverses the interior of the fluid container in a direction parallel to, and spaced apart from, the diameter line, and the photon path is along a non-diametric chord of the fluid container.

11. The fluid measurement device of claim 10, wherein the photon path has an extent, in a width direction thereof, from 20% of a radial distance of the fluid container to 80% of the radial distance of the fluid container.

12. The fluid measurement device of claim 10, wherein the fluid measurement device is a fluid flow measurement device, and wherein the fluid container is a fluid flow conduit.

13. The fluid measurement device of claim 10, further comprising a microwave transmission measurement device.

14. The fluid measurement device of claim 10, wherein the fluid measurement device is a Venturi device and the fluid container is a fluid flow conduit of the Venturi device.

15. The fluid measurement device of claim 14, further comprising a microwave transmission measurement device, wherein the microwave transmission measurement device is located at a narrow portion of the fluid container and the exempt gamma-ray source and the gamma-ray detector are located at the inlet side of the fluid container.

16. The fluid measurement device of claim 15, wherein the photon path is a first photon path, the microwave transmission measurement device has a microwave transmission antenna and a microwave receiving antenna that together define a second photon path, and the second photon path extends along a diameter of the fluid container.

17. The fluid measurement device of claim 16, wherein the first photon path and the second photon path are respectively angled.

18. A method of fluid flow measurement, comprising:

disposing an exempt gamma-ray source and a gamma-ray detector outside a fluid container to define a first photon path between the exempt gamma-ray source and the gamma-ray detector that traverses an interior of the fluid container along a non-diametric path;

disposing a microwave transmitting antenna and a microwave receiving antenna outside the fluid container to define a second photon path between the microwave transmitting antenna and the microwave receiving antenna that traverses the interior of the fluid container;

flowing a non-separated multi-phase fluid through the fluid container in a vertical direction from an inlet side to an outlet side of the fluid container, the fluid container having a diameter line perpendicular to the vertical direction;

while flowing the non-separated multi-phase fluid through the fluid container, obtaining a count rate of gamma photons propagated through the non-separated multi-phase fluid using the exempt gamma-ray source and the gamma-ray detector and measuring dielectric properties of the non-separated multi-phase fluid using the microwave transmitting antenna and the microwave receiving antenna;

measuring pressure drop as the non-separated multi-phase fluid flows through a flow restriction of the fluid container;

determining water-liquid ratio of the non-separated multi-phase fluid from the count rate of gamma photons;

determining a gas fraction of the non-separated multi-phase fluid from the dielectric properties and the water-liquid ratio;

calculating a mixture density of the non-separated multi-phase fluid based on the water-liquid ratio and the gas fraction;

determining volumetric flow rate of the non-separated multi-phase fluid from the measured pressure drop and the mixture density; and determining volumetric flow rates of gas, water, and oil in the non-separated multi-phase fluid from the volumetric flow rate of the non-separated multi-phase fluid, the gas fraction, and the water-liquid ratio.

19. The method of claim 18, further comprising measuring a density of water, oil, and gas in the non-separated multi-phase fluid and determining mass flow rates of the water, the oil, and the gas in the non-separated multi-phase fluid from the volumetric flow rates of the water, the oil, and the gas and the density of the water, the oil, and the gas.

20. The method of claim 18, wherein the exempt gamma-ray source, the gamma-ray detector, the microwave transmitting antenna, and the microwave receiving antenna are all located at the flow restriction of the fluid container.

* * * * *